US006731110B2

(12) United States Patent
Church

(10) Patent No.: US 6,731,110 B2
(45) Date of Patent: May 4, 2004

(54) MAGNETO-RESISTIVE DEVICE WITH BUILT-IN TEST STRUCTURE AND METHOD FOR DETERMINING RESISTANCE AND TRACK WIDTH

(75) Inventor: Mark A. Church, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/156,218

(22) Filed: May 28, 2002

(65) Prior Publication Data

US 2003/0222645 A1 Dec. 4, 2003

(51) Int. Cl.[7] ............... G11B 5/455; G01R 27/08; G01R 33/12; H01L 43/08
(52) U.S. Cl. ............... 324/210; 324/699; 324/713; 29/603.09; 360/317
(58) Field of Search ............... 324/699, 713, 324/210, 212, 252; 29/593, 603.01, 603.07, 603.09, 609.12; 300/234.3–234.5, 317, 319, 122

(56) References Cited

U.S. PATENT DOCUMENTS

| | | | | |
|---|---|---|---|---|
| 5,023,991 A | * | 6/1991 | Smith | 29/603.09 |
| 5,390,420 A | | 2/1995 | Schultz | |
| 5,494,473 A | * | 2/1996 | Dupuis et al. | 29/603.09 X |
| 5,703,485 A | | 12/1997 | Guo et al. | |
| 5,805,390 A | * | 9/1998 | Takeura | 360/11.3 |
| 5,854,554 A | | 12/1998 | Tomita et al. | |
| 6,208,477 B1 | | 3/2001 | Cloke et al. | |
| 6,373,660 B1 | * | 4/2002 | Lam et al. | 360/234.5 |
| 6,483,298 B2 | * | 11/2002 | Heim et al. | 324/210 |

OTHER PUBLICATIONS

IBM Technical Disclosure Bulletin, "In–Situ Sheet Resistance Sensor for Thin Film Head Lapping", pp. 371–372, vol. 32, No. 1, Jun. 1989.
IBM Technical Disclosure Bulletin, "Using Magneto–Resistive Head Transducers as Lapping Transducers and a Parallel Resistor System to Calculate Lapping Constants", pp. 79–82, vol. 36, No. 9A, Sep. 1993.

* cited by examiner

Primary Examiner—Gerard R. Strecker
(74) Attorney, Agent, or Firm—Bracewell & Patterson, L.L.P.

(57) ABSTRACT

A magneto-resistive device with built-in test structure. The magneto-resistive device includes a slider having first and second lower termination pads and first and second upper termination pads. A first conductive trace element electrically couples the first lower termination pad to the first upper termination pad and a second conductive trace element electrically couples the second lower termination pad to said second upper termination pad. The magneto-resistive device also includes a magneto-resistive transducer deposited on the slider and the resistance of the magneto-resistive transducer is obtained by passing an electrical current between the first and second lower termination pads and measuring a voltage across the first and second upper termination pads.

21 Claims, 5 Drawing Sheets

MAGNETO-RESISTIVE DEVICE WITH BUILT-IN TEST STRUCTURE AND METHOD FOR DETERMINING RESISTANCE AND TRACK WIDTH

BACKGROUND OF THE INVENTION

1. Technical Field

The present invention relates in general to data storage systems and, in particular, to magneto-resistive sensors. More particularly, the present invention relates to a magneto-resistive device having a built-in test structure and a method for determining resistance and track width of a magneto-resistive transducer.

2. Description of the Related Art

A thin film MR head employs a magneto-resistive (MR) transducer for reading information signals from a moving magnetic medium, such as a rotating magnetic disk. Conductive leads are employed for connecting the MR sensor to externally located read pads and a sense current is applied to the MR transducer via the read pads. Magnetic fields from the magnetic medium cause resistance changes in the MR transducer that, in turn, cause potential changes across the read pads which are sensed by a detector, such as a differential amplifier. The output of the detector is the readback signal.

Shields employed in the MR transducer prevent destructive interference of the magnetic field from adjacent transitions in the media (a.k.a. ISI or intersymbol interference). Accordingly, the MR transducer and the conductive leads are sandwiched between first and second insulation gap layers and the first and second gap layers are sandwiched between first and second shield layers. The MR device, which comprises the MR transducer, literally "flies" with respect to a rotating magnetic disk, supported by a thin cushion of air that the disk moves between the disk and a air bearing surface (ABS) of the MR transducer. The thin cushion of air is commonly referred to as an "air bearing". The air bearing provides a first force which is counterbalanced by a second force from a suspension which carries the MR device. The counterbalance can be designed to provide a very small distance ("flying height") between the ABS and the rotating disk, such as 0.075 microns. With this arrangement the MR device can read information from each circular track on a rotating magnetic disk with high resolution.

Generally, the combined inductive write transducer and MR read transducer are formed from adjacent layers of material on a wafer substrate so as to read and write on the same track. The fabrication of the devices generally comprises a sequence of deposition and etching steps with the MR transducer formed first, and the inductive write transducer formed on top of the MR transducer. The MR transducer typically comprises a magneto-resistive stripe and two conductive leads on either side thereof. The stripe height is a critical feature and is determined by the height defining edge, which is the bottom edge of the stripe. The inductive transducer typically includes a bottom pole, an insulating layer, half an electrical coil, an insulating layer, a top pole, an insulating layer and the other half of the coil. The coil halves are interconnected by means of vias, and the coil and the two conductive leads of the MR transducer are connected to terminals by means of vias. The inductive transducer poles are narrowed to a very narrow pole tip having a precisely controlled width, or throat, the width of which defines the recorded track width.

Typically, rows of transducers are deposited simultaneously on the wafer substrate using conventional process methods. The wafer substrate may be a hard ceramic material which is used to form disk sliders or tape modules, with the transducers deposited thereon. The substrate is then cut into rows of sliders in a side-by-side relationship with the pole tips of the inductive write transducers and the MR stripes of the MR read transducers extending to an edge of the substrate row. The row edge is then lapped to the optimum dimensions of throat height and stripe height.

With stripe height ranges below 0.100 um and 0.20 um mean expected in the near future, MR devices are becoming more difficult to fabricate. The ability to control wafer process and disposition with ever increasing requirements are also adding to the complexity and difficulty of fabricating the MR devices. For example, to accommodate the reduction in stripe heights, the MR devices track width requirements will have to controlled to less than 10% against track values of less than 0.30 um.

Accordingly, what is needed in the art are more direct and improved methods for assessing key performance related process variation. More particularly, what is needed in the art is an improved MR device with a built-in test structure that will allow for more direct measurement and efficient monitoring of the MR device's characteristics.

SUMMARY OF THE INVENTION

To address the above discussed deficiencies in the prior art, and in accordance with the invention as embodied and broadly described herein, a magneto-resistive device with a built-in test structure is disclosed. The magneto-resistive device includes a slider having first and second lower termination pads and first and second upper termination pads. A first conductive trace element electrically couples the first lower termination pad to the first upper termination pad and a second conductive trace element electrically couples the second lower termination pad to the second upper termination pad. The magneto-resistive device also includes a magneto-resistive transducer deposited on the slider and the resistance of the magneto-resistive transducer is obtained by passing an electrical current between the first and second lower termination pads and measuring a voltage across the first and second upper termination pads.

In another advantageous embodiment, the present invention discloses a method for determining a track width of a magneto-resistive transducer included on a slider on a wafer substrate, where the wafer substrate has at least first and second sliders. Each of the first and second sliders also includes first and second lower and upper termination pads and the magneto-resistive transducers associated with the first and second sliders have different stripe heights, e.g., 3.0 and 5.0 um. The method includes electrically coupling, on each slider, the first lower termination pads with the first upper termination pad and the second lower termination pad with the second upper termination pad. The total resistance, i.e., transducer resistance and lead resistances, of each of the first and second magneto-resistive transducers is determined by driving a current through the first and second upper termination pads of each transducer and measuring the resultant potential difference across the first and second upper termination pads of the respective transducer. Following which, the transducer resistances of the first and second magneto-resistive transducers are determined by passing a current through the first and second lower termination pads and measuring a voltage across the first and second upper termination pads. Subsequently, the track width of the first and second magneto-resistive transducers are computed utilizing the following relationship:

$$MRW = [(Dh)(MRS3)(MRS5)]/[Rs(MRS3-MRS5)],$$

where MRW is the track width, Dh is the delta of the stripe heights of the magneto-resistive transducers, MRS3 is the resistance of the first magneto-resistive transducer, MRS5 is the resistance of the second magneto-resistive transducer and RB is a sheet resistance of the wafer substrate.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
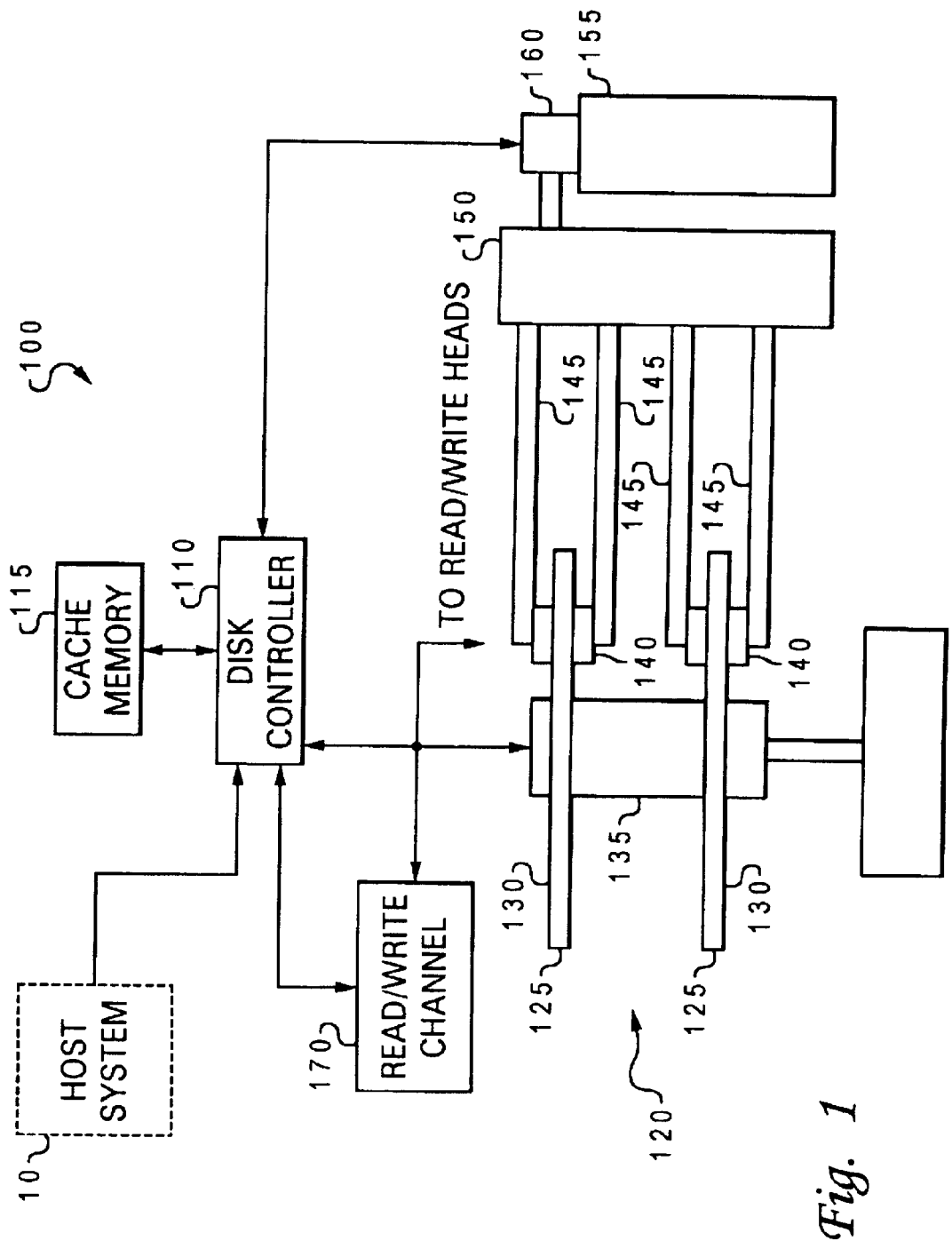
FIG. 1 illustrates an exemplary digital data storage system that provides a suitable environment for the practice of the present invention.

With reference now to the figures and in particular with reference to FIG. 1, there is depicted, in a simplified and diagrammatic form, an exemplary digital data storage system 100 that provides a suitable environment for the practice of the present invention. Data storage system 100, in an advantageous embodiment, is a hard disk drive and includes a controller 110 coupled to a cache memory 115. It should be noted that although the present invention will be described in the context of a data storage system, the present invention does not contemplate limiting its practice to any one particular data storage system. Data storage system 100 also includes a stack 120 of disks, generally designated 125, each of which having at least one magnetic surface 130. Disks 125 are generally mounted parallel to one another for simultaneous rotation on and by an integrated spindle and motor assembly 135. Information on each magnetic disk surface 130 is read from or written to disk surface 130 by a corresponding transducer head assembly 140 movable in a path having a radial component across rotating disk surface 130. The information read from or written to disk surface is provided to disk controller 110 via a read/write channel 170 coupled to transducer head assemblies 140.

Each transducer head assembly 140, including a magneto-resistive device, is mounted on a flexure spring (not shown) carried by an arm 145. Arms 145 are typically ganged together for simultaneous pivotal movement about a support spindle 150. One arm 145 includes an extension driven in pivotal movement by a head drive servo motor 155 that includes a voice coil 160 cooperating with an internal magnet and core assembly. Drive signals applied to voice coil 160 cause arms 145 to move in unison to position transducer head assemblies 140 in registration with information storage tracks on disk surfaces 130 where information is written or read.

Data storage system 100 is controlled in operation by signals provided by controller 110, including motor control and head positioning signals. In a typical arrangement, controller 110 provides an interface with a host system 10, such as a conventional computer, that, in an advantageous embodiment, provides data read and write commands. Servo position information is recorded on disk surface 130 and transducer heads 140 read this servo information to provide a servo position signal to controller 110. This information is utilized by controller 110 to provide position control signals. The purpose of this position feedback system is to assure accurate and continuous positioning of transducer heads 140 so that data is written to or read from precise locations on disk surfaces 130.

Figure 2A:
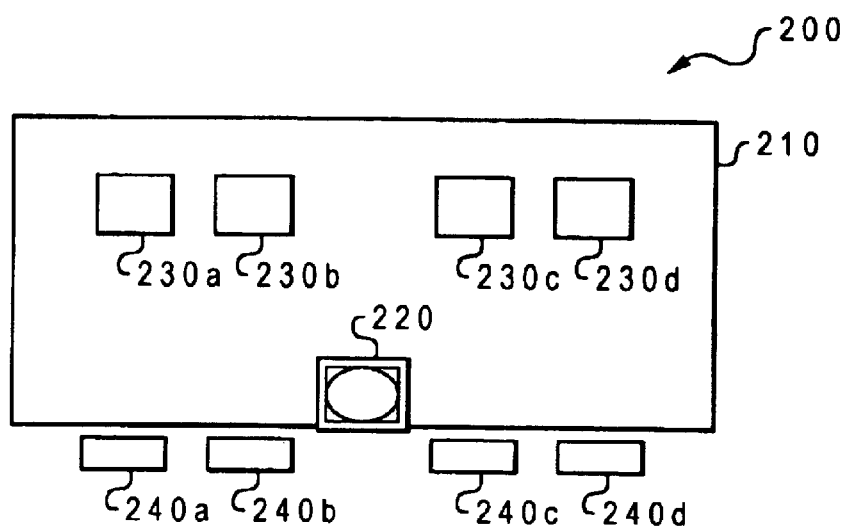
FIG. 2A illustrates a simplified representation of an embodiment of a magneto-resistive (MR) device with a built in test structure according to the present invention.

Referring now to FIG. 2A, there is illustrated a simplified representation of an embodiment of a magneto-resistive (MR) device 200 with a built in test structure according to the present invention. MR device 200 includes a slider 210 and a MR transducer 220 deposited on slider 210. MR transducer 220 generally consists of an inductive write head and a MR read head. The write and read heads, or transducers, are typically formed from adjacent layers of material on a wafer substrate. MR device 200 also includes first and second lower termination pads 240b, 240c and first and second shield short test pads 240a, 240d that are utilized to, as their name implies, test for shield shorts in MR transducer 220. Also shown in the illustrated embodiment are first through fourth upper termination pads 230a–230d that provides a means for connecting the read and write heads in MR transducer 220 to processing circuitry, such as read/write channel 170 depicted in FIG. 1, that receives and transmits signals to and from MR transducer 220.

Figure 2B:
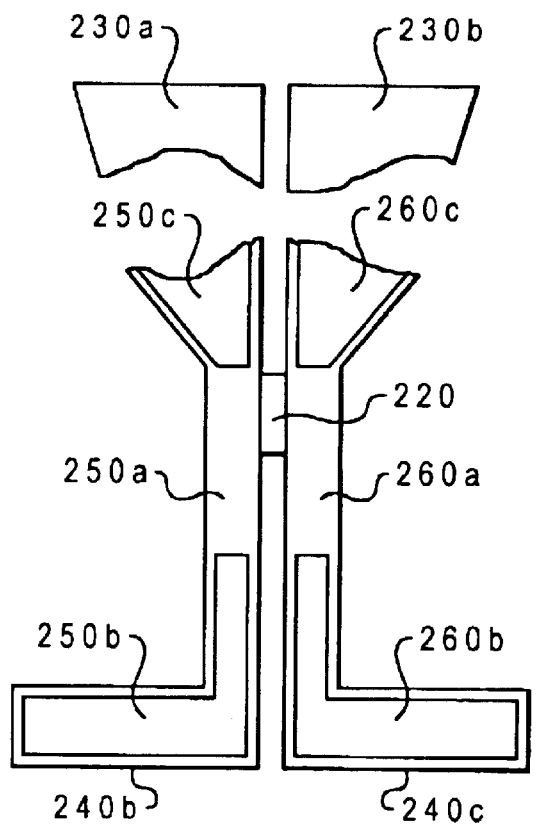
FIG. 2B illustrates a simplified cross-sectional view of the MR device illustrating first and second conductive traces coupling the first and second lower termination pads to the first and second upper termination pads, respectively.

Turning now to FIG. 2B, there is depicted a simplified cross-sectional view of MR device 200 illustrating first and second conductive traces coupling first and second lower termination pads 240b, 240c to first and second upper termination pads 230a, 230b, respectively. As shown in the illustrated embodiment, each of the first and second conductive traces, in an advantageous embodiment, includes three sections, i.e., first, second and third sections 250a–c and 260a–c, respectively. First sections 250a, 260a of the first and second conductive traces are formed utilizing a conductive material, such as Rhodium, that extends to both the upper and lower termination pads. Second sections 250b, 260b of the conductive traces, which is thicker in size than first sections 250a, 260a, are comprised of a conductive material, such as copper, deposited on the Rhodium extending to the lower termination pads. Similarly, third sections 250c, 260c of the conductive traces are also formed utilizing a material, such as copper, deposited on the Rhodium of first sections 250a, 260a extending to the upper termination pads. The construction and utilization of this novel test structure will be described in greater detail hereinafter with reference to FIGS. 3A and 3B.

It should be noted that although the illustrated embodiment describes a connection scheme where the first conductive trace connects first lower termination pad 240b to first upper termination pad 230a and the second conductive trace connects second lower termination pad 240c to second upper termination pad 230b, the present invention does not contemplate limiting its practice to the described connection scheme. In other advantageous embodiments, first lower termination pad 240b may be coupled to second upper termination pad 230b and second lower termination pad 240c may be coupled to first upper termination pad 230a. Alternatively, first and second lower termination pads 240b, 240c may be coupled to third and fourth upper termination pads 230c, 230d, respectively.

Figure 3A:
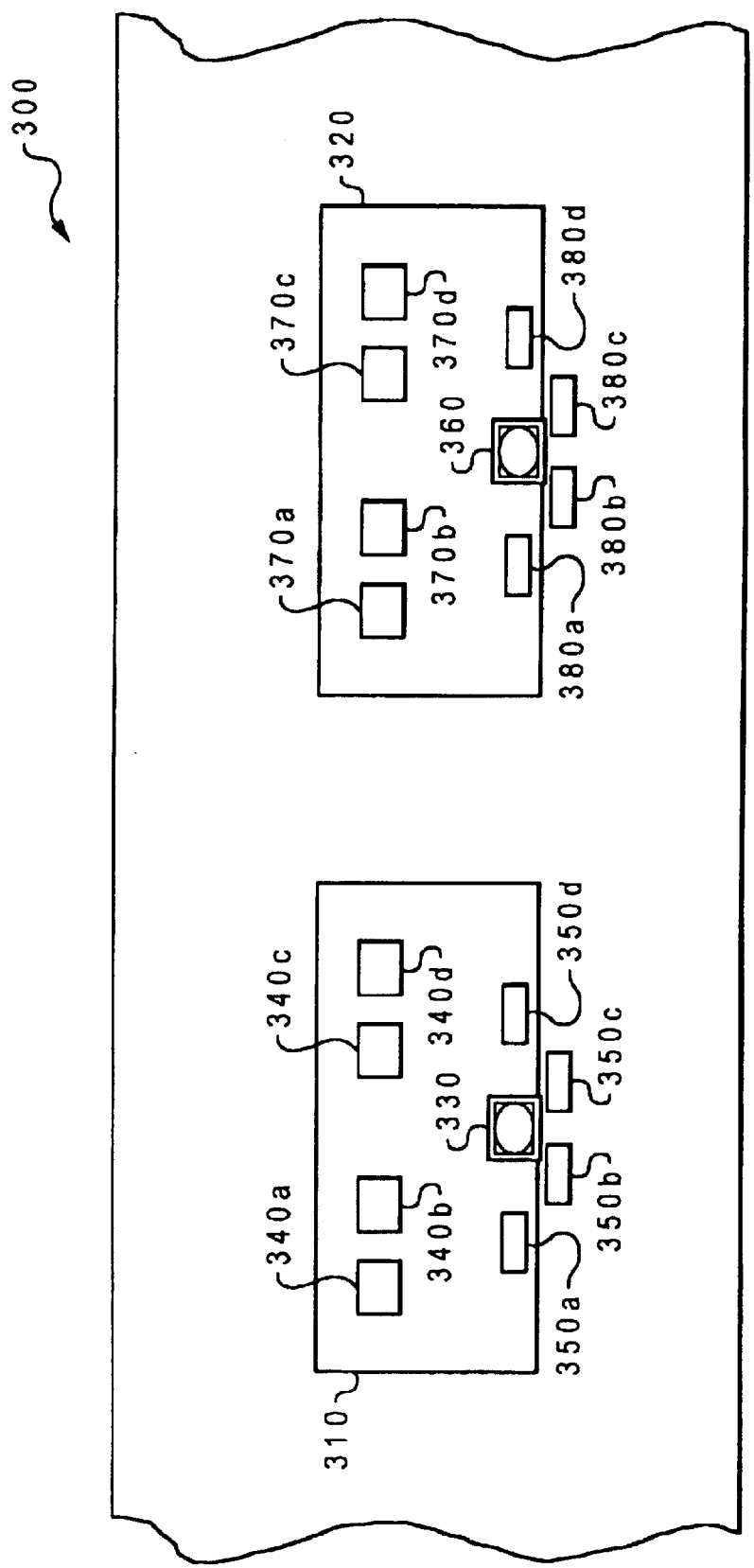
FIG. 3A illustrates an embodiment of a wafer substrate having first and second MR devices, i.e., slider assemblies, having built-in test structures according to the principles of the present invention.

Turning now to FIG. 3A, there is depicted an embodiment of a wafer substrate 300 having first and second MR devices, i.e., slider assemblies, 310, 320, having built-in test structures according to the principles of the present invention. Typically, rows of transducers are deposited simultaneously on wafer substrate 300 utilizing conventional deposition techniques. For ease of explanation, a wafer substrate having only two MR devices will be described. Wafer substrate may be a hard ceramic material that is used to form sliders assemblies 310, 320, on which first and second MR transducers 330, 360 are deposited thereon, respectively. In the illustrated embodiment, first and second sliders 310, 320 have stripe heights values of 3.0 um and 5.0 um, respectively. In should be noted that MR devices formed on a wafer substrate will generally have alternating stripe height values of 3.0 um and 5.0 um. First and second sliders 310, 320 also include first and second lower termination pads 350b, 350c and 380b, 380c, respectively, and first and second shield short pads 350a, 350d and 380a, 380d, respectively. It should be noted that first slider 310 shield short pads, i.e., first and second shield short pads 350a, 350d, and second slider 320 shield short pads, i.e., first and second shield short pads 380a, 380d, are relocated from the positions shown in FIG. 2A to accommodate the extension of the leads from the lower to upper termination pads that will be described in greeter detail hereinafter. Each of first and second sliders 310, 320 also includes first through fourth upper termination pads 340a–340d and 370a–370d, respectively.

Figure 3B:
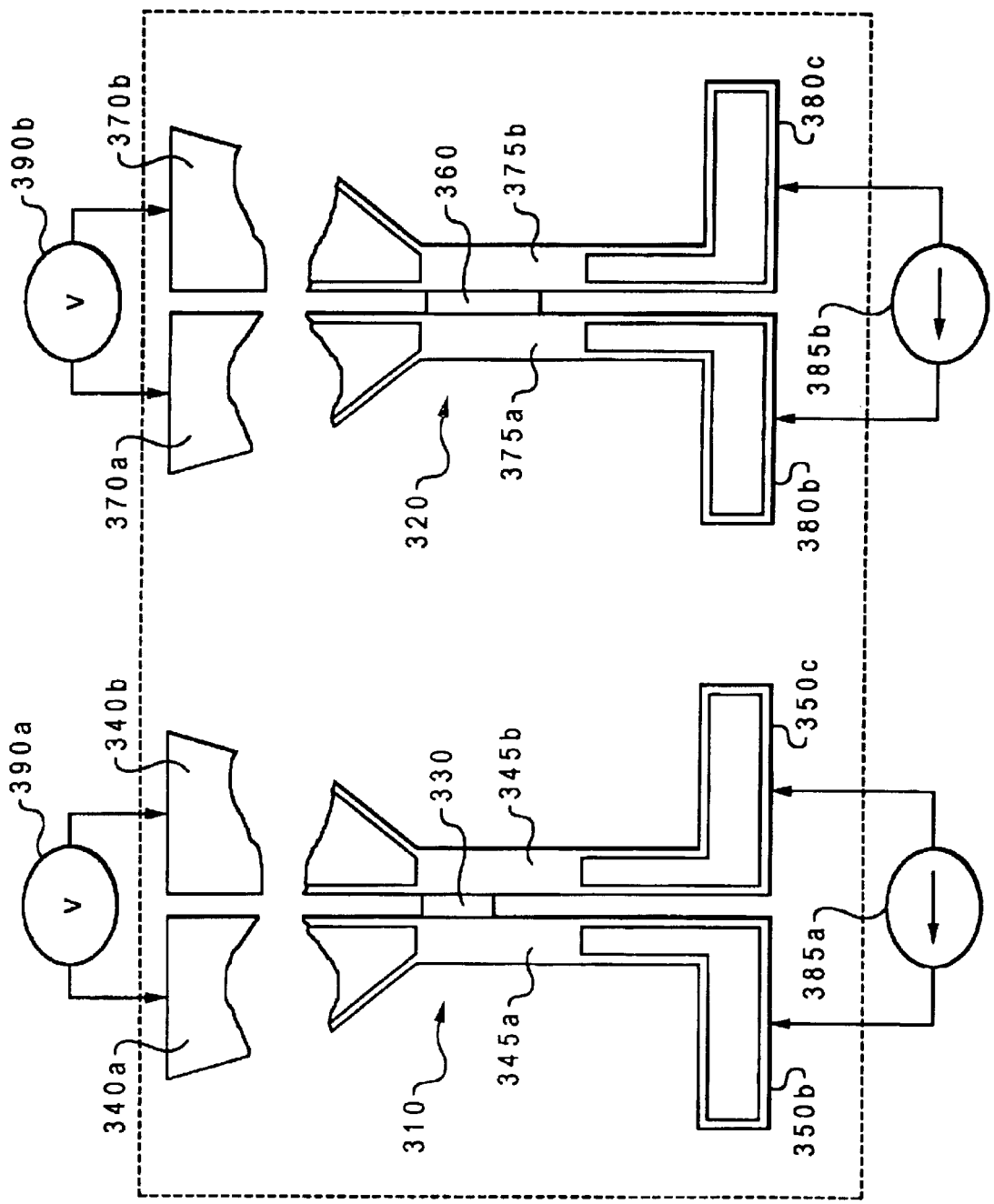
FIG. 3B illustrates a simplified cross sectional view of first and second sliders depicting the MR stripe and conductive traces in accordance with the principles of the present invention.

Referring now to FIG. 3B, there is illustrated a simplified cross sectional view of first and second sliders 310, 320 depicting the MR stripe and conductive traces in accordance with the principles of the present invention. In the case of first slider 310, first and second conductive traces 345a, 345b that conventionally couple MR transducer 330 to first and second upper termination pads 340a, 340b are extended to terminate at first and second lower termination pads 350b, 350c. As in standard practice, the conductive trace, or lead, thickness is increased in areas away from the eventual air bearing region utilizing conventional deposition techniques that are well known in the art to minimize the value of the lead resistances. Similarly, an additional deposition layer is provided to the extended portions of first and second conductive traces 345a, 345b extending away from the eventual air bearing region terminating at first and second lower termination pads 350b, 350c. Following which, all subsequent MR read and write element layers are deposited utilizing conventional process steps. The conductive traces' additional vias are formed utilizing conventional process techniques. Additional metalization is also provided for the first and second lower termination pads 350b, 350c. This allows for the routing of studs up through overcoat with final, e.g., gold pad, deposition terminating at first and second upper termination pads 340a, 340b. It should be also be noted that, although the shield short pads have been relocated from their convention positions, the first shield short pad 350a is still coupled to a MR transducer 330 shield element. The structure and the formation of first and second conductive traces 375a, 375b in second slider 320 are analogous to first slider 310.

To utilize the new test structure disclosed by the present invention to determine, for example, the MR transducer resistance, a conventional current source is coupled to the lower termination pads of the slider to generate a current through the lower termination pads. The resultant voltage developed across the upper termination pads is measured utilizing a conventional measuring device, such as a voltmeter. Utilizing Ohm's law, the MR transducer resistance is obtained by dividing the measured voltage by the current generated through the lower termination pads. It should be noted that the computed resistance value is the MR transducer resistance without the leads, i.e., conductive traces, resistances. This is because when current is passed through the lower termination pads, the resultant voltage drop measured across the upper termination pads is independent of the lead resistances which is typical of four terminal configurations. Alternatively, in an advantageous embodiment, the current source and voltmeter devices are embodied in a dedicated device tester, which is well known in the art, or a data processing system, e.g., a personal computer, that have the required functionality to control a current source and measure the resulting potential difference across the upper termination pads. In the illustrated embodiment, first current source 385a is coupled to first slider's 310 first and second lower termination pads 350b, 350c and second current source 385b is coupled across second slider's 320 first and second lower termination pads 380b, 380c. Also shown in the illustrated embodiment, are first and second voltage measuring devices 390a, 390b that are coupled across first and second sliders' 310, 320 first and second upper termination pads 340a, 340b and 370a, 370b, respectively. A method for determining the track width of the MR transducer will be described in greater detail hereinafter with reference to FIG. 4, with continuing reference to FIGS. 3A and 3B.

Figure 4:
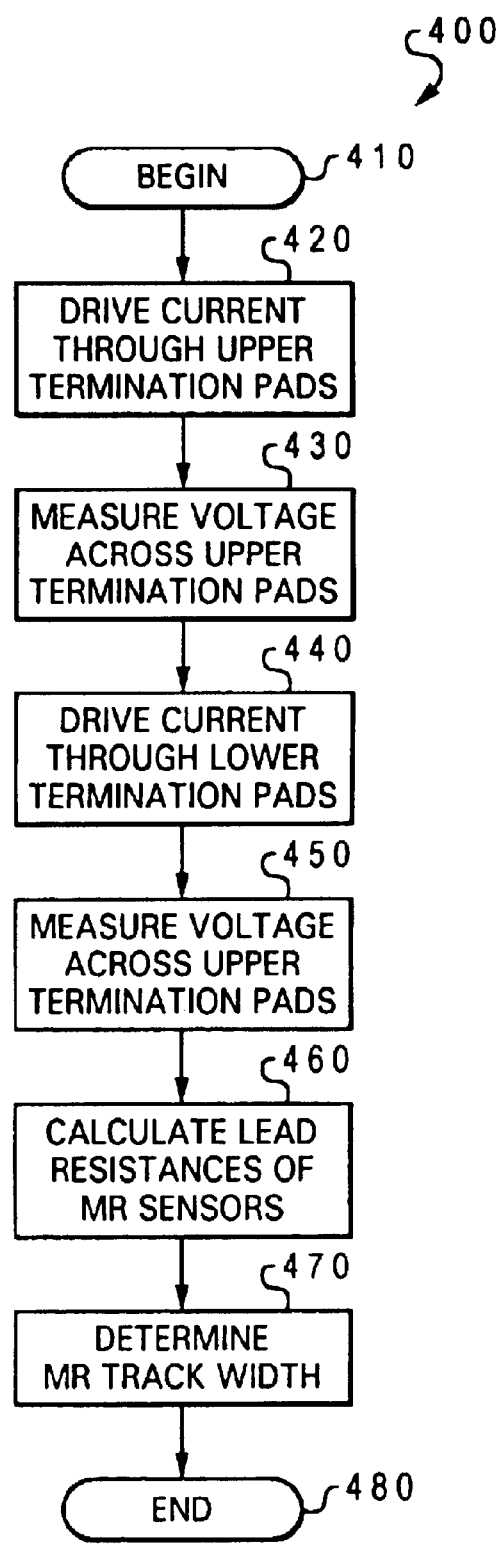
FIG. 4 illustrates an embodiment of a high-level process flow 400 for determining a track width of a MR transducer utilizing the principles disclosed by the present invention.

Referring now to FIG. 4, there is depicted an embodiment of a high-level process flow 400 for determining a track width of a MR transducer utilizing the principles disclosed by the present invention. Process 400 is initiated, as illustrated in step 410, following which the total resistances of the first and second MR transducer 330, 360 are determined. The total resistance (MR3) of first MR transducer 330 and the total resistance (MR5) of second MR transducer 360, which includes the resistances of the conductive traces, i.e., leads, are determined by driving a current through the upper termination pads of the respective slider and measuring the voltage developed across the upper termination pads of the sliders. For example, in the case of first slider 310, a current is generated utilizing a conventional current source and applied to first and second upper termination pads 340a, 340b as depicted in step 420. The resultant potential difference across first and second upper termination pads 340a, 340b is then measured utilizing, e.g., a conventional voltmeter, as illustrated in step 430. The total resistance of first MR transducer 330 is the computed by dividing the measured voltage across first and second upper termination pads 340a, 340b by the current applied to first and second upper termination pads 340a, 340b. The total resistance of second MR transducer 360 is determined in a similar manner.

Following the determination of the total resistances of first and second MR transducers 330, 360, process 400 proceeds to determine the MR transducer resistances of first and second MR transducers 330, 360. First, as depicted in step 440, a current, e.g., of magnitude 0.25 ma, is generated by first current source 385a and applied to first and second lower termination pads 350b, 350c of first slider 310. Similarly, a current of 0.25 ma is generated by second current source 385b and passed through first and second lower termination pads 380b, 380c of second slider 320.

Subsequently, as illustrated in step 450, the potential differences developed across first and second upper termination pads 340a, 340b and 370a, 370b of first and second sliders 310, 320 are determined utilizing first and second voltage measuring devices 390, 390b, respectively. The resistances of first MR transducer 330 (MRS3) and second MR transducer 360 (MRS5) are then computed by dividing the measured voltages by the current. Although not necessary for the practice of the present invention, an additional advantage of the present invention is that following the determination of first and second MR transducers' 330, 360 resistances, the conductive trace resistances of the MR transducers may also be determined. The conductive trace resistances of first and second MR transducers 330, 360 are computed, as depicted in step 460, utilizing the following relationships:

$$RL3 = (MR3 - MRS3) \quad (1)$$

and $$RL5 = (MR5 - MRS5) \quad (2)$$

where RL3 is the lead, or conductive trace, resistance of first MR transducer 330 and RL5 is the lead resistance of second MR transducer 360.

Next, process 400 proceeds to determine the track width of the MR transducers as illustrated in step 470. It should be noted that the MR transducer sheet resistance (Rs) is assumed to be already known. As it well known in the art, the MR transducer sheet resistance is generally obtained by test sites utilizing a multi-terminal test that will not be described in greater detail herein. Furthermore, even though the above described measurements are conducted at each slider, a single value for the sheet resistance can be utilized. This is because under current conventional process technologies, the MR sheet resistance is held to better than 1% within a wafer. The MR track width (MRW) for a given MR transducer is determined by applying the sheet resistance (Rs) to a differential stripe calculation as follows:

$$MRW = [(Dh)(MRS3)(MRS5)] / [Rs(MRS3 MRS5)] \quad (3)$$

where Dh is the delta MR stripe height of first and second MR transducers 330, 360.

Following the determination of the MR track width of first and second MR transducers 330, 360, process 400 is terminated at step 480, or alternatively, repeated for a second pair of MR transducers.

The present invention provides for the direct measurement of a MR transducer and the calculation of the initial lead resistance, transducer resistance and track width, allowing for better characterization and process control during its manufacture and assembly. The computed data can be utilized to improve process control or for determining element disposition. Furthermore, the measured and computed data can also be provided to the fabrication process for row level process "kiss lap" with direct feedback or utilized in the direct feedback for the single slider lapping process.

In an advantageous embodiment, the method for determining a track width of a MR transducer disclosed by the present invention is implemented as a computer executable software program. As discussed in FIG. 3B, the present invention may be implemented within an exemplary data processing unit, e.g., personal computer or a conventional dedicated device tester. It should be noted that although the present invention has been described, in one embodiment, in the context of an electronic device, such as personal computer, those skilled in the art will readily appreciate that the present invention described hereinabove may be implemented, for example, by other suitable electronic modules to execute a corresponding sequence of machine-readable instructions. These instructions may reside in various types of signal-bearing media. In this respect, one aspect of the present invention concerns a programmed product, that includes signal-bearing media tangibly embodying a program of machine-readable instructions executable by a digital data processor to perform the method for determining a track width of a MR transducer described above. The present invention does not contemplate limiting its practice to any particular type of signal-bearing media, i.e., computer-readable medium, utilized to actually carry out the distribution. Examples of signal-bearing media includes recordable type media, such as floppy disks, hard disk drives and flash memory, and transmission type media such as digital and analog communication links and wireless.

While the invention has been particularly shown and described with reference to a preferred embodiment, it will be understood by those skilled in the art that various changes in form and detail may be made therein without departing from the spirit and scope of the invention.

What is claimed is:

1. A magneto-resistive device with built-in test structure, comprising:
    a slider having:
        first and second lower termination pads;
        first and second upper termination pads;
        a first conductive trace element that electrically couples said first lower termination pad to said first upper termination pad; end
        a second conductive trace element that electrically couples said second lower termination pad to said second upper termination pad; and
        magneto-resistive element electrically connected to said first conductive trace element and said second conductive trace element.

2. The magneto-resistive device as recited in claim 1, wherein said magneto-resistive element is a magneto-resistive transducer deposited on said slider.

3. The magneto-resistive device as recited in claim 2, wherein said magneto-resistive transducer has a stripe height of 3.0 um.

4. The magneto-resistive device as recited in claim 2, wherein said magneto-resistive transducer has a stripe height of 5.0 um.

5. The magneto-resistive device as recited in claim 1, wherein said slider further includes a shield short pad.

6. A method for determining a resistance of a magneto-resistive transducer included on a slider having first and second lower termination pads and first and second upper termination pads, comprising:

electrically coupling maid first lower termination pad with said first upper termination pad at a first coupling point and said second lower termination pad with said second upper termination pad at a second coupling point;

electrically coupling said magneto-resistive transducer to said first coupling point and to said second coupling point;

passing a current through said first and second lower termination pads; and measuring a voltage across said first and second upper termination pads.

7. The method as recited in claim 6, wherein said current is substantially about 0.25 ma.

8. The method as recited in claim 6, wherein said resistance of said magneto-resistive transducer is computed by dividing said voltage by said current.

9. A method for determining a track width of a magneto-resistive transducer included on a slitter on a wafer substrate, wherein said wafer substrate has at least first and second sliders, each of said first and second sliders having first and second lower termination pads and first and second upper termination pads, and wherein first and second magneto-resistive transducers associated with said first and second sliders, respectively, have different stripe heights, comprising:

electrically coupling, for each of said first and second sliders, said first lower termination pad with said first upper termination pad at a first coupling point and said second lower termination pad with said second upper termination pad at a second coupling point; and electrically coupling each of said first and second magneto-resistive transduces to said first coupling point and said second coupling point of said associated slider, respectively;

determining magneto-resistive transducer resistances of said first and second magneto-resistive transducers, including:

passing a current through said first and second lower termination pads; and measuring a voltage across said first and second upper termination pads.

10. The method as recited in claim 9, further comprising:

determining total resistances of said first and second magneto-resistive transducers, including:

passing a current through said first and second upper termination pads; and measuring a voltage across said first and second upper termination pads; and calculating Bald magneto-resistive transducer track width.

11. The method as recited in claim 10, wherein said magneto-resistive transducer track width is characterized by:

$$MRW=[(Dh)\ (MRS3)\ (MRS5)]/[Rs\ (MRS3-MRS5)],$$

wherein MRW is said track width, Dh is a delta of said first and second magneto-resistive transducers' stripe heights, MRS3 is said resistance of said first magneto-resistive transducer, MRS5 is said resistance of said second magneto-resistive transducer and Rs is a sheet resistance of said wafer substrate.

12. A computer-readable medium having stored thereon computer executable instructions for implementing a method for determining a resistance of a magneto-resistive transducer included on a slider having first and second lower termination pads and first and second upper termination pads and having said magneto-resistive transducer electrically coupled to said first and second lower termination pads and said first and second upper termination pads, wherein said computer executable instructions execute to perform the steps of:

passing a current through said first and second lower termination pads; and measuring a voltage across said first and second upper termination pads, wherein said first lower termination pad is electrically coupled to said first upper termination pad and said second lower termination pad is electrically coupled to said second upper termination pad.

13. The computer-readable medium as recited in claim 12, wherein said current is substantially about 0.25 ma.

14. The computer-readable medium as recited in claim 12, wherein said resistance of said magneto-resistive transducer is computed by dividing said voltage by said current.

15. A computer-readable medium having stored thereon computer executable instructions for implementing a method for determining a track width of a magneto-resistive transducer included on a slider on a wafer substrate, wherein said wafer substrate has at least first and second sliders, each of said first and second sliders having first and second lower termination pads and first and second upper termination pads, and wherein first and second magneto-resistive transducers associated with said first and second sliders, respectively, having different stripe heights and being electrically coupled to said first and second lower termination pads and said first and second upper termination pads of said associated slider, respectively, wherein said computer executable instructions execute to perform the steps of;

determining magneto-resistive transducer resistances of said first and second magneto-resistive transducers, wherein for each of said first and second sliders, said first lower termination pad is electrically coupled to said first upper termination pad and said second lower termination pad is electrically coupled to said second upper termination pad, including:

passing a current through said first and second lower termination pads; and measuring a voltage across said first and second upper termination pads.

16. The computer-readable medium as recited in claim 15, wherein said computer executable instructions further perform the steps of:

determining total resistances of said first and second magneto-resistive transducers, including:

passing a current through said first and second upper termination pads; and measuring a voltage across said first and second upper termination pads; and calculating said magneto-resistive transducer track width.

17. The computer-readable medium as recited in claim 16, wherein said magneto-resistive transducer track width is characterized by:

$$MRW=[(Dh)\ (MRS3)\ (MRS5)]/[Rs\ (MRS3-MRS5)],$$

wherein MRW is said track width, Dh is a delta of said first and second magneto-resistive transducers' stripe heights, MRS3 is said resistance of said first magneto-resistive transducer, MRS5 is said resistance of said second magneto-resistive transducer and Rs is a sheet resistance of said wafer substrate.

18. A data storage system, comprising:
   a disk controller;
   a read/write channel coupled to said disk controller; and
   at least one transducer bead assembly coupled to maid read/write channel, said transducer head assembly including:
      a magneto-resistive device with built-in test structure, comprising:
         a slider having:
         first and second lower termination pads;
         first and second upper termination pads;
         a first conductive trace element that electrically couples said first lower termination pad to said first upper termination pad;
         a second conductive trace element that electrically couples said second lower termination pad to said second upper termination pad;
         a magneto-resistive element electrically connected to said first conductive trace element and said second conductive trace element.

19. The data storage system as recited in claim 18, wherein said magneto-resistive element is a magneto-resistive transducer deposited on said slider.

20. The data storage system as recited in claim 19, wherein said magneto-resistive transducer has a stripe height of 3.0 um.

21. The data storage system as recited in claim 19, wherein said magneto-resistive transducer has a stripe height of 5.0 um.

* * * * *

UNITED STATES PATENT AND TRADEMARK OFFICE
CERTIFICATE OF CORRECTION

PATENT NO. : 6,731,110 B2
DATED : May 4, 2004
INVENTOR(S) : Church, Mark A.

It is certified that error appears in the above-identified patent and that said Letters Patent is hereby corrected as shown below:

Column 9,
Line 23, please delete the word "slitter" and replace with the word -- slider --.
Line 54, please delete the word "Bald" and replace with the word -- said --.

Column 12,
Line 3, please add the word -- and -- after the word "pad;".

Signed and Sealed this

Nineteenth Day of April, 2005

JON W. DUDAS
*Director of the United States Patent and Trademark Office*